(12) United States Patent
Nakamura et al.

(10) Patent No.: US 6,255,797 B1
(45) Date of Patent: *Jul. 3, 2001

(54) AC MOTOR WITH REACTOR INTERPOSED BETWEEN AC MOTOR AND POWER SOURCE

(75) Inventors: Kosei Nakamura; Michi Masuya; Hisashi Maeda; Yohei Arimatsu, all of Yamanashi (JP)

(73) Assignee: Fanuc Ltd., Yamanishi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,843
(22) PCT Filed: Dec. 26, 1996
(86) PCT No.: PCT/JP96/03825
§ 371 Date: Sep. 4, 1997
§ 102(e) Date: Sep. 4, 1997
(87) PCT Pub. No.: WO97/25770
PCT Pub. Date: Jul. 17, 1997

(30) Foreign Application Priority Data
Jan. 5, 1996 (JP) ............................................. 8-17078

(51) Int. Cl.[7] ................................................. H02P 1/26
(52) U.S. Cl. ...................................... 318/771; 318/773
(58) Field of Search ........................... 318/771, 772–773, 318/804; 307/105

(56) References Cited

U.S. PATENT DOCUMENTS

| 4,644,242 | * | 2/1987 | Takata et al. | 318/771 |
| 5,300,870 | * | 4/1994 | Smith | 318/768 |
| 5,760,567 | * | 6/1998 | Nakamura et al. | 318/771 |

FOREIGN PATENT DOCUMENTS

| 0 139 869 | 5/1985 | (EP) . |
| 47-19310 | 9/1972 | (JP) . |
| 60-32596 | 2/1985 | (JP) . |
| 62-166797 | 7/1987 | (JP) . |
| 62-222982 | 9/1987 | (JP) . |
| 3-3693 | 1/1991 | (JP) . |

* cited by examiner

*Primary Examiner*—David Martin
(74) *Attorney, Agent, or Firm*—Staas & Halsey LLP

(57) ABSTRACT

A reactor (32) and a switch (35) are interposed in parallel between U-phase, V-phase and W-phase on a power source side (31) and U, V and W terminals on a motor side (33). A changeover switch )37) is interposed between Z, X and Y terminals on the motor side (33) and the U, V and W terminals on the motor side (33). When the switch (35) is set to OFF, the changeover switch (37) is set to ON, and the switch (35) is set up so as to interconnect Z, X and Y terminals, windings of the motor are set up in the form of Y-connection, so that the motor and a power source are connected directly to each other. On the other hand, when the changeover switch (37) is switched over to OFF, and the switch (35) is set up so as to interconnect Z, X and Y terminals to the U, V and W terminals, the windings of the motor are set up in the form of Δ-connection, so that the motor and the power source are connected together through the reactor (32).

6 Claims, 9 Drawing Sheets

F I G. 5
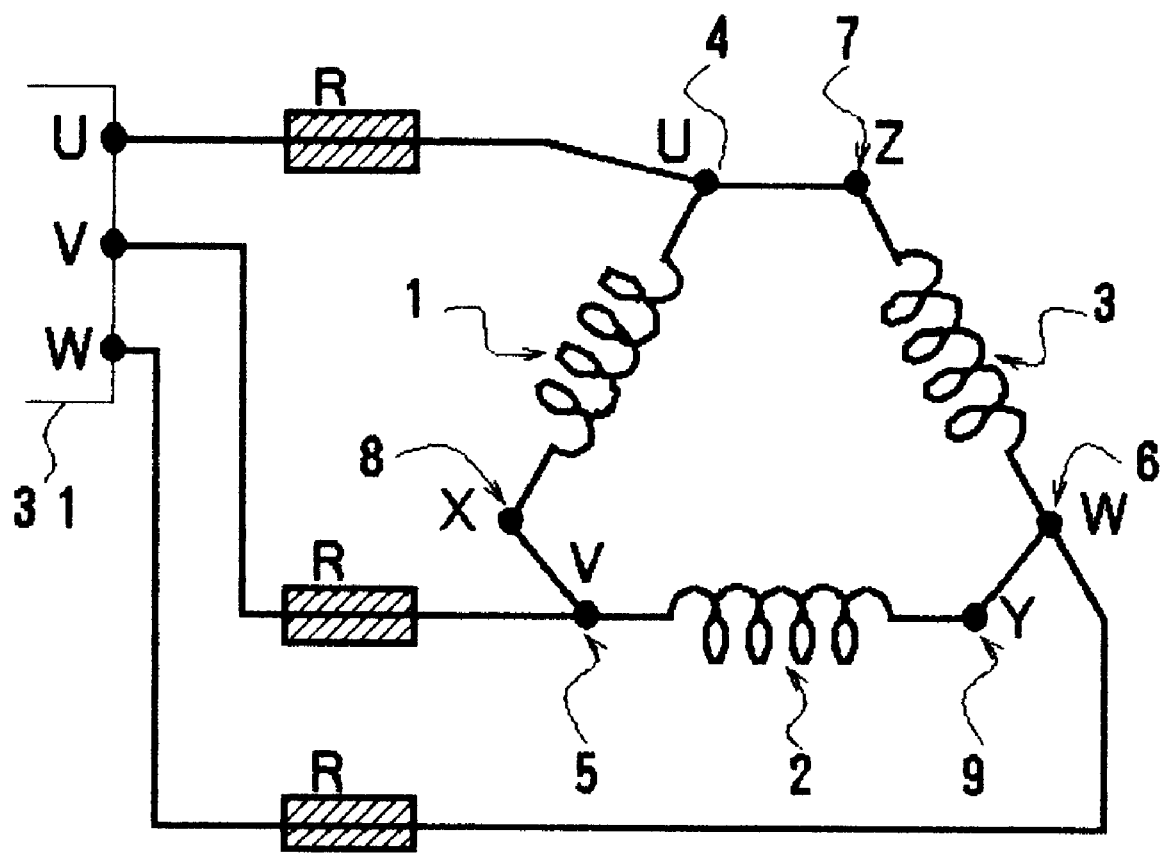

AC MOTOR WITH REACTOR INTERPOSED BETWEEN AC MOTOR AND POWER SOURCE

TECHNICAL FIELD

This invention relates to a three-phase AC motor with a reactor interposed between the AC motor and a power source side for the purpose of suppressing generation of heat in a rotor and a stator by decreasing a higher harmonic component included in voltage.

BACKGROUND ART

In an AC motor which employs a three-phase alternating current drive source, in some cases, the drive of such an AC motor is controlled by supplying voltage of non-sinusoidal waveform such as stepped waveform to the motor. Such a voltage of non-sinusoidal waveform contains a higher harmonic component. A loss resulting from the higher harmonic component in the supply voltage ultimately produces heat, which causes heat operation in the motor.

In general, the AC motor has both high-speed output characteristics to generate high output at high-speed revolution and low-speed output characteristics to generate high output at low-speed revolution. The high-speed output characteristics or the low-speed output characteristics are attained by varying the number of turns of primary winding in the motor or by selecting between Y-connection and Δ-connection.

Heat generated due to the higher harmonic component contained in drive voltage of the motor presents a problem particularly when the motor is operated with the connection for high-speed output characteristics. Thus, in order to suppress the generation of heat due to the higher harmonic components as described above, a reactor is interposed between the power source and the motor to attenuate the higher harmonic component contained in the drive voltage. The reactor is effective in suppressing the generation of heat in a rotor and a stator of the motor at high-speed revolution, whereas impedance of the reactor causes a decrease in the amount of current supplied to the primary winding at low-speed revolution, resulting in reduction of output.

With reference to FIGS. 8A and 9B, description will first be given of a method for attaining two kinds of characteristics, that is, characteristics for high-speed operation and those for low-speed operation, by switching over primary winding connection in an AC motor, which employs a three-phase alternating drive source.

Referring to FIG. 8A, primary winding comprises U-phase winding 1, V-phase winding 2 and W-phase winding 3 of a motor, which are set up in the form of a Y-connection, and this Y-connection is adapted to attain the characteristics for low-speed operation. The U-phase winding 1 has U and X terminals, the V-phase winding 2 has V and Y terminals, and the W-phase winding 3 has W and Z terminals. The X, Y and Z terminals of the windings are interconnected. Then, U, V and W terminals on a power source side 31 are respectively connected to the U, V and W terminals of the windings 1, 2 and 3 set up in the form of the Y-connection.

FIG. 8B shows Δ-connection switched over from the connection (Y-connection) of the windings shown in FIG. 8A. This Δ-connection is adapted to attain the characteristics for high-speed operation. In FIG. 8B, the U, V and W terminals are respectively connected to the Z, X and Y terminals. Then, the U, V and W terminals on the power source side 31 are respectively connected to the U, V and W terminals of the windings 1, 2 and 3 in Δ-connection.

Next, referring to FIGS. 9A and 9B, a description will now be given of a method for attaining two kinds of characteristics, that is, characteristics for high-speed operation and those for low-speed operation, by switching over a voltage application terminal of a primary winding in an AC motor, which employs a three-phase alternating drive source.

Referring to FIG. 9A, first and second U-phase windings 10, 11 connected in series, first and second V-phase windings 12, 13 connected in series and first and second W-phase windings 14, 15 connected in series are in Y-connection. Then, a terminal U1 of the first U-phase winding, a terminal V1 of the first V-phase winding and a terminal W1 of the first W-phase winding are respectively connected to U, V and W terminals on a power source side 31. Thus, the number of turns in each phase comes to the sum of turns of two windings (10, 11; 12, 13; 14, 15). This connection is suitable for attaining the characteristics for low-speed operation.

Referring to FIG. 9B, a terminal U2 of the second U-phase winding, a terminal V2 of the second V-phase winding and a terminal W2 of the second W-phase winding in the windings in Y-connection shown in FIG. 9A are respectively connected to the U, V and W terminals on the power source side 31. Thus, the number of turns in each phase becomes equal to the number of turns of a single winding (11, 13, 15), so that the number of turns in each phase is less than in the case shown in FIG. 9A, and as a result, this connection is suited for obtaining the characteristics for high-speed operation.

Next, referring to FIGS. 10A and 10B, a description will now be given of a prior art, in which a reactor is interposed between a power source and a motor in switching between Y-connection and Δ-connection shown in FIGS. 8A and 8B.

Referring to FIG. 10A, a reactor 32 is interposed between U, V and W terminals on a power source side 31 and U, V and W terminals of a motor 33. A first switch 35 is interposed between the reactor 32 and the U, V and W terminals of the motor 33. Further, a second switch 36 is connected to Z, X and Y terminals of the motor 33.

In FIG. 10A, since the first switch 35 is at an off or open or closed position and the second switch 36 is at on position, the U, V and W terminals on the power source side 31 are respectively connected to the U, V and W terminals of the motor 33 through the reactor 32, and the X, Y and Z terminals of the motor are interconnected, so that Y-connection is formed. That is, a wiring shown in FIG. 10A is similar to that shown in FIG. 8A, except that the reactor 32 is interposed between the U, V and W terminals on the power source side 31 and the U, V and W terminals of the motor 33.

Referring to FIG. 10B, the first switch 35 in FIG. 10A is switched over to a closed or on-position, and the second switch 36 in FIG. 10A is switched over to an open or off-position. As a result, the U, V and W terminals on the power source side 31 are respectively connected to U and Z, V and X and W and Y terminals of the motor 33 through the reactor 32, so that Δ-connection is set up. That is, a wiring shown in FIG. 10B is similar to that shown in FIG. 8B, except that the reactor 32 is interposed between the U, V and W terminals on the power source side 31 and the U, V and W terminals of the motor 33.

In the foregoing, as shown in FIGS. 10A and 10B, the reactor 32 is interposed between the power source side 31 and the motor 33 in both the cases where switching to Y-connection (FIG. 10A) is made for attaining the characteristics for low-speed operation and where switching to the Δ-connection (FIG. 10B) is made for attaining the characteristics for high-speed operation. Thus, when the characteristics for high-speed operation are attained by the Δ-connection, this reactor 32 is effective in suppressing the generation of heat by decreasing the higher harmonic component. On the other hand, when an attempt to attain the characteristics for low-speed operation is made through switching to Y-connection, the reactor functions so as to reduce output.

DISCLOSURE OF THE INVENTION

It is an object of the present invention to provide an improved three-phase AC motor with a reactor interposed between this AC motor and a power source side for the purpose of suppressing generation of heat in a rotor and a stator by decreasing a higher harmonic component include in voltage, wherein the reactor is inhibited from causing the fall of output when winding connection is switched over to attain the characteristics for low-speed operation, or when a voltage application terminal of a winding is switched over.

In order to attain the above object, a motor as a mode according to the present invention comprises a connection switching means for switching primary winding connection in a three-phase AC motor between Y-connection and Δ-connection; a reactor interposed between a power source and the motor; and a reactor interposition changeover means, connected to the reactor, for selective switching between the state, in which voltage is supplied from the power source to the motor side through the reactor, and the state, in which voltage is supplied from the power source to the motor side without passing through the reactor.

In a motor as another mode according to the present invention, a primary winding in the motor is provided with a voltage application terminal group to increase the number of turns in the primary winding, and a second voltage application terminal group to decrease the number of turns in the primary winding. A reactor is interposed between a power source and the motor. A reactor interposition changeover means is connected to the reactor for selective switching between the state where voltage is supplied from the power source to the motor side through the reactor, and the state where voltage is supplied from the power source to the motor side without passing through the reactor.

According to the present invention, the reactor is disconnected when the primary winding in the motor is set up in the form of joint or connection for low-speed operation, while the reactor is connected when the primary winding in the motor is set up in the form of joint or connection for high-speed operation.

BRIEF DESCRIPTION OF THE DRAWINGS

FIG. 5 is a view for explaining a wiring of connection between the power source side and the motor side shown in FIG. 1B;

FIG. 6 is a view for explaining a wiring of connection between the power source side and the motor side shown in FIG. 2B;

BEST MODE OF EMBODYING THE INVENTION

A description will first be given of embodiments, as first and second embodiments, in which a reactor is interposed between a power source side and a motor side when the characteristics for high-speed operation are required, while the reactor is disconnected when the characteristics for low-speed operation are required, where primary winding connection in an AC motor employing a three-phase alternating drive source is switched over to a Y-connection so as to attain the characteristics for low-speed operation, while primary winding connection described above is switched over to a Δ-connection so as to attain the characteristics for high-speed operation.

First Embodiment

A description will now be given below of a first embodiment with reference to FIGS. 1A and 1B.

Figure 1A:
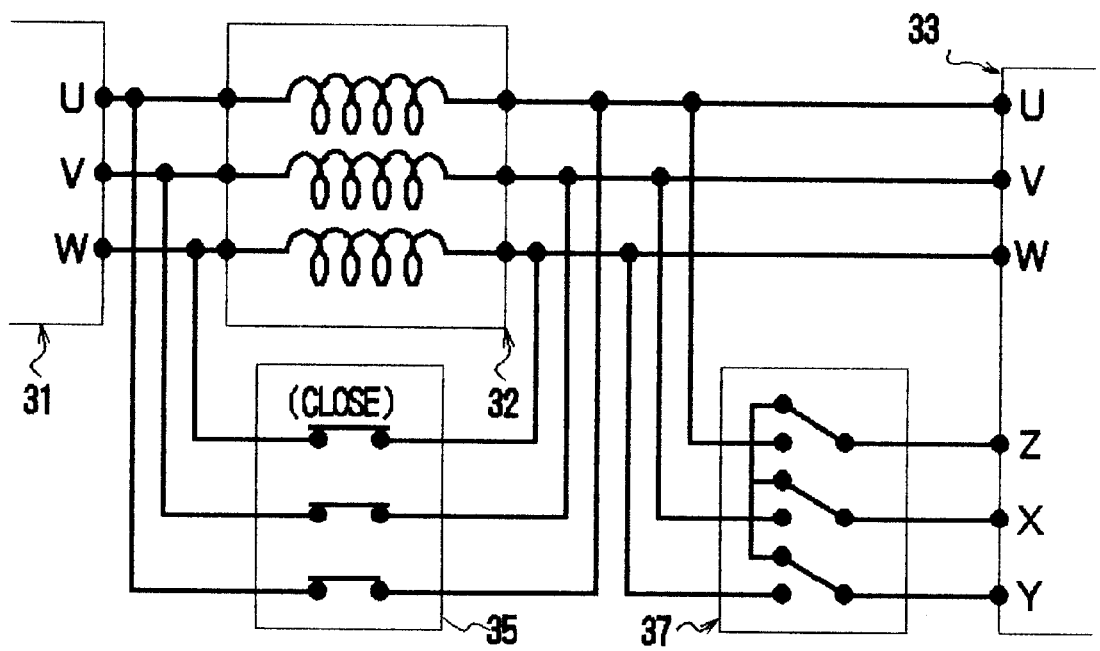
FIG. 1A is a wiring diagram of connection between a power source side and a motor side as a first embodiment according to the present invention, in which a switch and a changeover switch are set to the state for low-speed operation.

Referring to FIG. 1A, a power source side 31 includes a three-phase power source having U-phase, V-phase and W-phase, and a motor side 33 is provided with U terminal, V terminal, W terminal, Z terminal, X terminal and Y terminal. A reactor 32 and a switch 35 are interposed in parallel between the U-phase, V-phase and W-phase on the power source side 31 and the U terminal, V terminal and W terminal on the motor side 33. Further, a changeover switch 37 is interposed between the Z terminal, X terminal and Y terminal on the motor side 33 and the U terminal, V terminal and W terminal on the motor side 33.

Figure 8A:
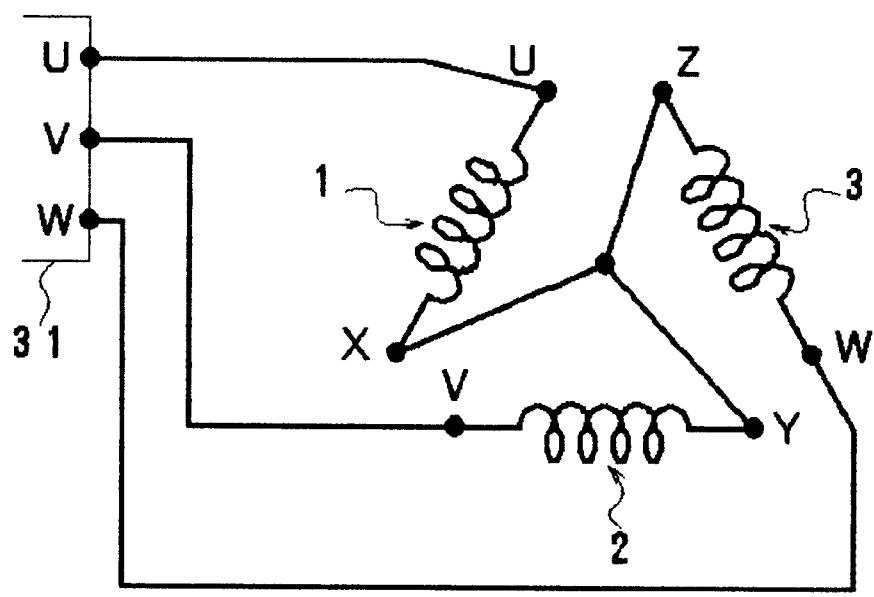
Figure 8B:
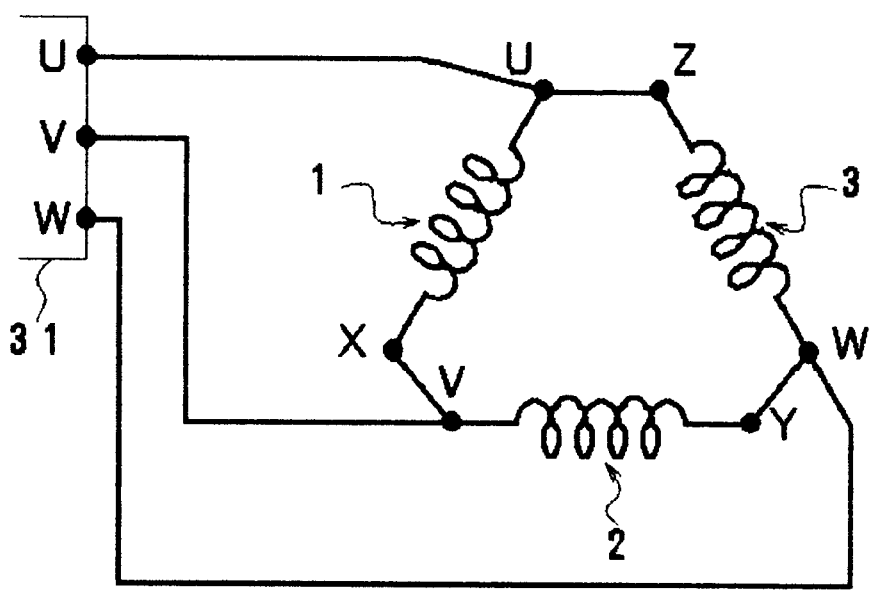

In FIG. 1A, since the switch 35 is turned on, current on the power source side 31 tends to flow toward the motor side 33 through both the switch 35 and the reactor 32. However, since the reactor 32 exerts a high impedance, the current on the power source side 31 is supplied to the motor side 33 mostly through the switch 35. That is, the reactor 32 in FIG. 1A is kept in a substantially disconnected state. On the other hand, the changeover switch 37 is switched over so as to interconnect the Z terminal, X terminal and Y terminal on the motor side 33. Thus, in FIG. 1A, the primary winding in the motor is set up in the form of Y-connection suitable for attaining the characteristics for low-speed operation, and besides, the reactor 32 is substantially in the state of disconnection from the power source side 31 and the motor side 33. That is, the power source side 31 and the motor side 33 in FIG. 1A are connected to each other as shown in FIG. 8A.

Figure 1B:
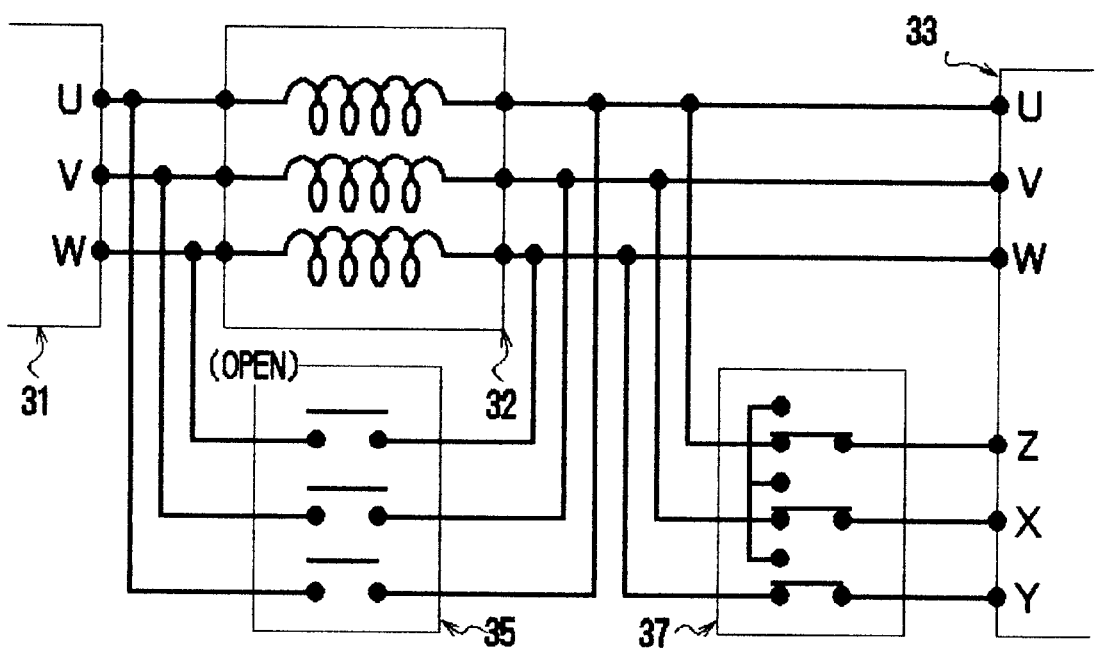
FIG. 1B is a wiring diagram of connection as the first embodiment according to the present invention, in which the switch and the changeover switch shown in FIG. 1A are switched over to the state for high-speed operation.

Referring to FIG. 1B, the switch 35 in FIG. 1A is switched over to the off-position, and the changeover switch 37 is switched over so as to connect the Z terminal, X terminal and Y terminal on the motor side 33 to the U terminal, V terminal and W terminal on the motor side 33. As a result, the motor side 33 is brought into the Δ-connection suitable for attaining the characteristics for high-speed operation, and besides, current on the power source side 31 is made to be supplied to the motor side 33 through the reactor 32. That is, the power source side 31 and the motor side 33 in FIG. 1B are connected to each other as shown in FIG. 5. Incidentally, reference character R in FIG. 5 denotes a reactor in each phase.

As described above, the switch 35 in FIGS. 1A and 1B has a function of making the reactor 32 to be interposed between the power source side 31 and the motor side 33 or to be disconnected from the power source side and the motor side by selecting between off state and on state of the switch. Further, the changeover switch 37 functions as a connection switching means capable of switching the primary winding connection in the motor between the Y-connection and the Δ-connection.

Second Embodiment

A description will now be given of a second embodiment with reference to FIGS. 1A and 2B.

Figure 2A:
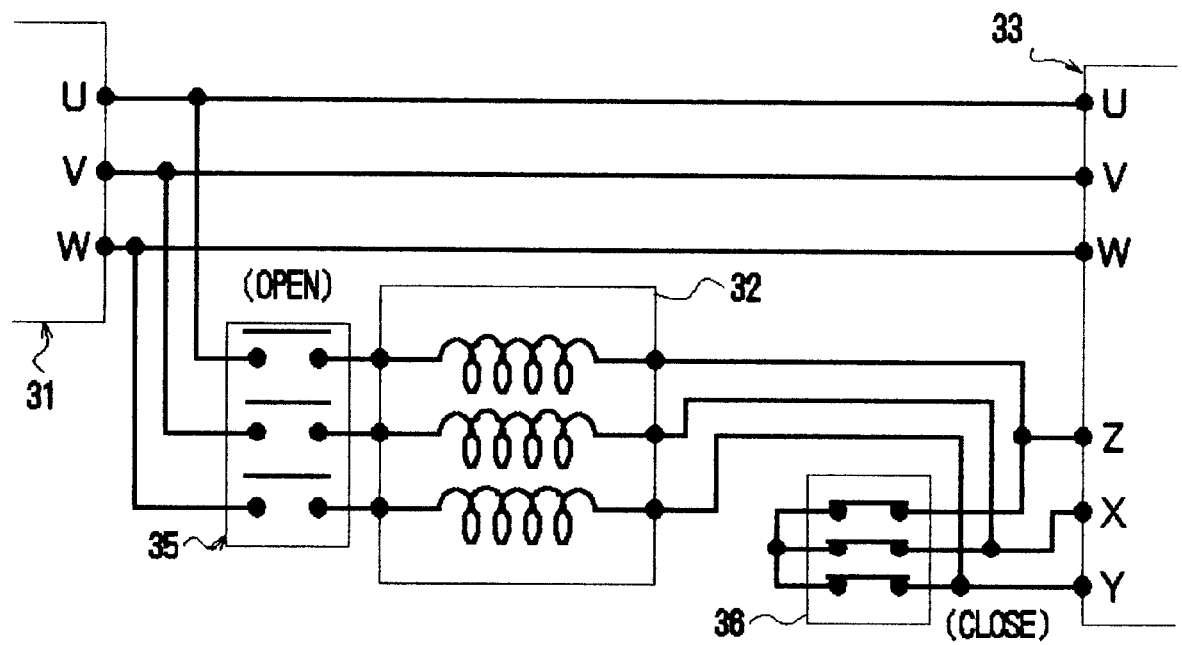
FIG. 2A is a wiring diagram of connection between a power source side and a motor side as a second embodiment according to the present invention, in which first and second switches are set for low-speed operation.

Referring to FIG. 2A, the U-phase, V-phase and W-phase on the power source side 31 are directly connected to the U terminal, V terminal and W terminal on the motor side 33.

Further, the U-phase, V-phase and W-phase on the power source side 31 are respectively connected to the Z terminal, X terminal and Y terminal on the motor side 33 through serial connectors composed of the first switch 35 and the reactor 32. Further, a second switch 36 is connected to the Z terminal, X terminal and Y terminal on the motor side 33.

In FIG. 2A, the first switch 35 is turned off, and the second switch 36 is turned on. Therefore, the Z terminal, X terminal and Y terminal on the motor side 33 are interconnected without being connected to the U-phase, V-phase and W-phase on the power source side 31, thereby providing a Δ-connection suitable for attaining the characteristics for low-speed operation. Besides, the reactor 32 is disconnected from the power source side 31 and the motor side 33. As a result, the power source side 31 and the motor side 33 in FIG. 2A are connected together as shown in FIG. 8A.

Figure 2B:
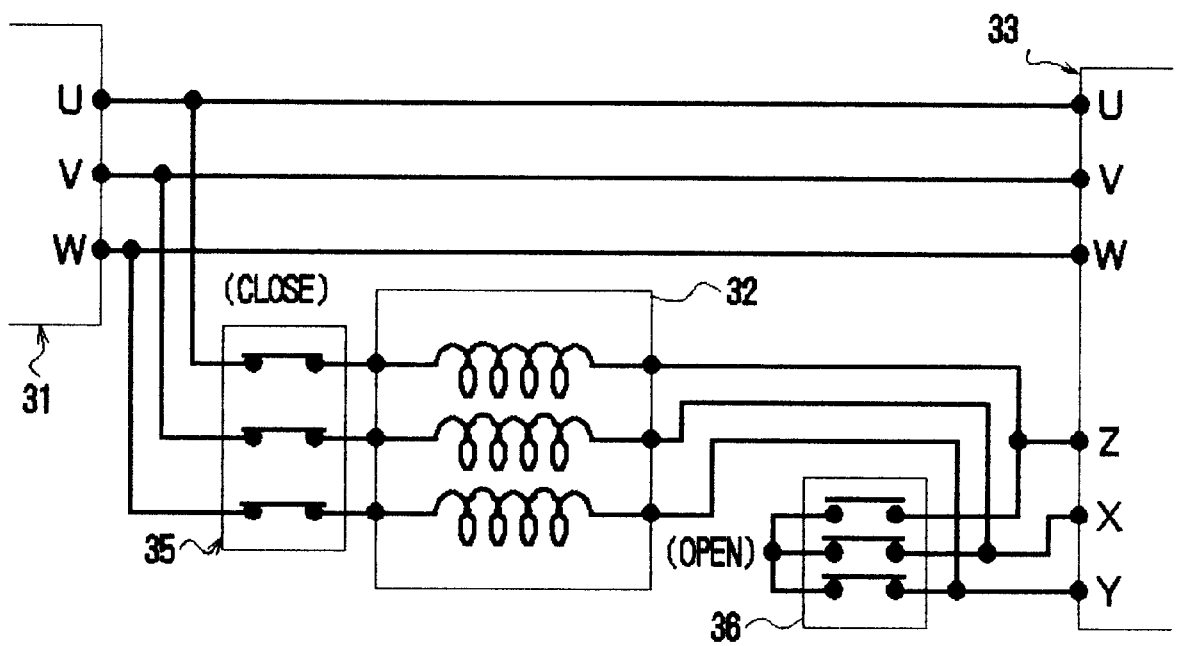
FIG. 2B is a wiring diagram of connection as the second embodiment according to the present invention, in which the first and second switches shown in FIG. 2A are switched over to the state for high-speed operation.

Referring to FIG. 2B, the first switch 35 in FIG. 2A is switched over to ON, while the second switch 36 in FIG. 2A is switched over to OFF. As a result, the Z terminal, X terminal and Y terminal on the motor side 33 are respectively connected to the U terminal, V terminal and W terminal on the motor side 33 through the reactor 32, thereby providing the Δ-connection suitable for attaining the characteristics for high-speed operation. As a result, the power source side 31 and the motor side 33 in FIG. 2B are connected together as shown in FIG. 6. Incidentally, reference character R in FIG. 6 denotes a reactor in each phase.

As described above, the first switch 35 in FIGS. 2A and 2B has a function for interposing the reactor 32 between the power source side 31 and the motor side 33 or disconnecting the reactor from the power source side and the motor side by selecting between ON state and OFF state of the first switch. Further, the second switch 36 functions as a connection switching means capable of switching primary winding connection in the motor between the Y-connection and the Δ-connection.

A description will now be given of the third and fourth embodiments, in which the reactor is interposed between the power source side and the motor when the characteristics for high-speed operation are required, while the reactor is disconnected when the characteristics for low-speed operation are required, in a case where a voltage application terminal of the primary winding of the motor is switched over to vary the number of turns so as to attain the characteristics for low-speed operation or those for high-speed operation.

Figure 9A:
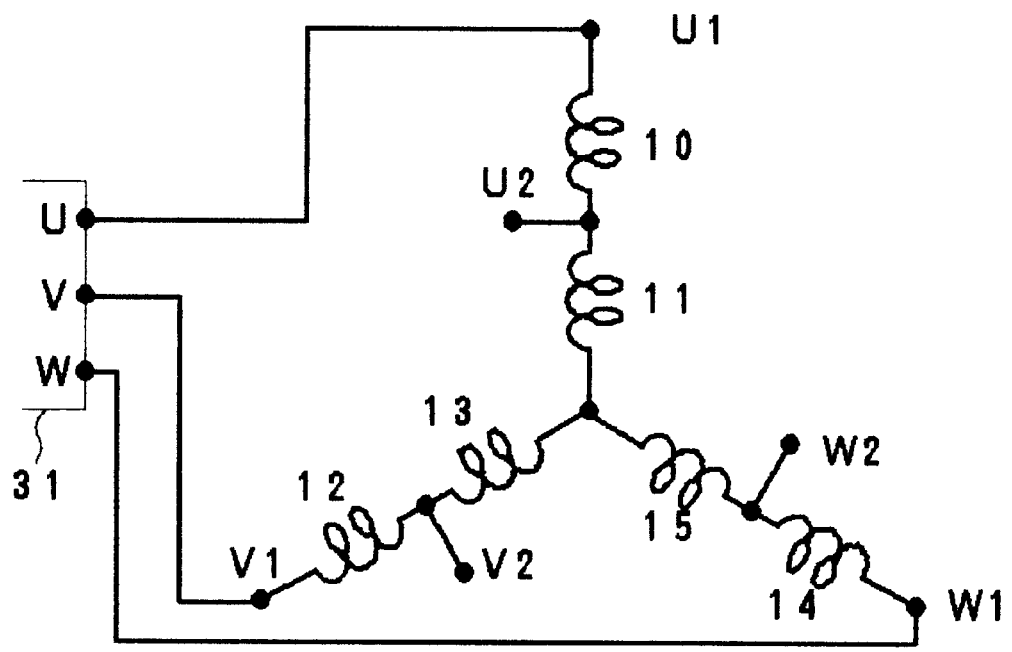
FIG. 9A is a view showing the state, in which primary winding in a three-phase motor is provided with a voltage application terminal group to increase the number of turns and a voltage application terminal group to decrease the number of turns, and a power source is connected to the voltage application terminal group to increase the number of turns.
Figure 9B:
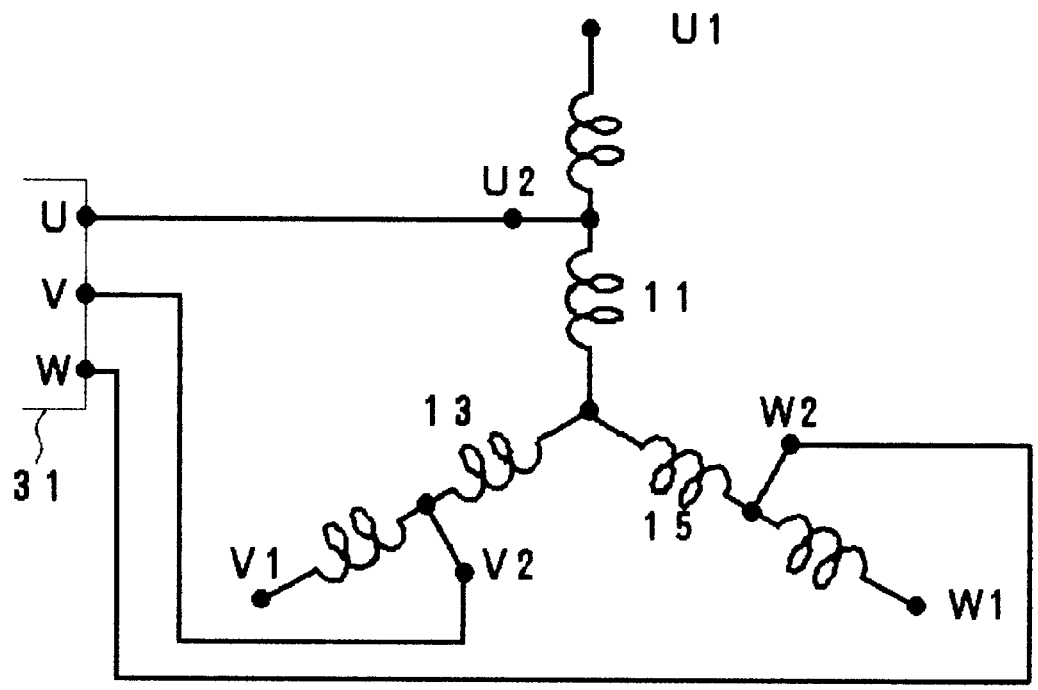
FIG. 9B is a view showing the state, in which a power source is connected to the voltage application terminal group to decrease the number of turns shown in FIG. 9A.
Figure 10A:
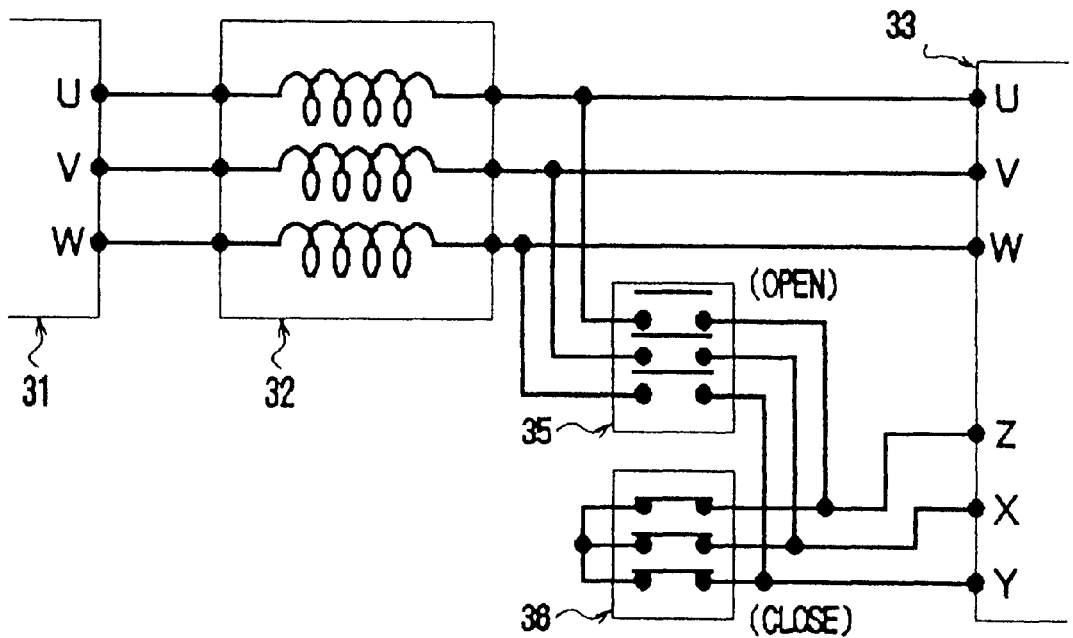
FIG. 10A is a wiring diagram of a prior art including a reactor interposed between a power source side and a motor side, and first and second switches connected to the motor side, wherein the first and second switches are switched over so that primary winding in a motor is set up in the form of Y-connection.
Figure 10B:
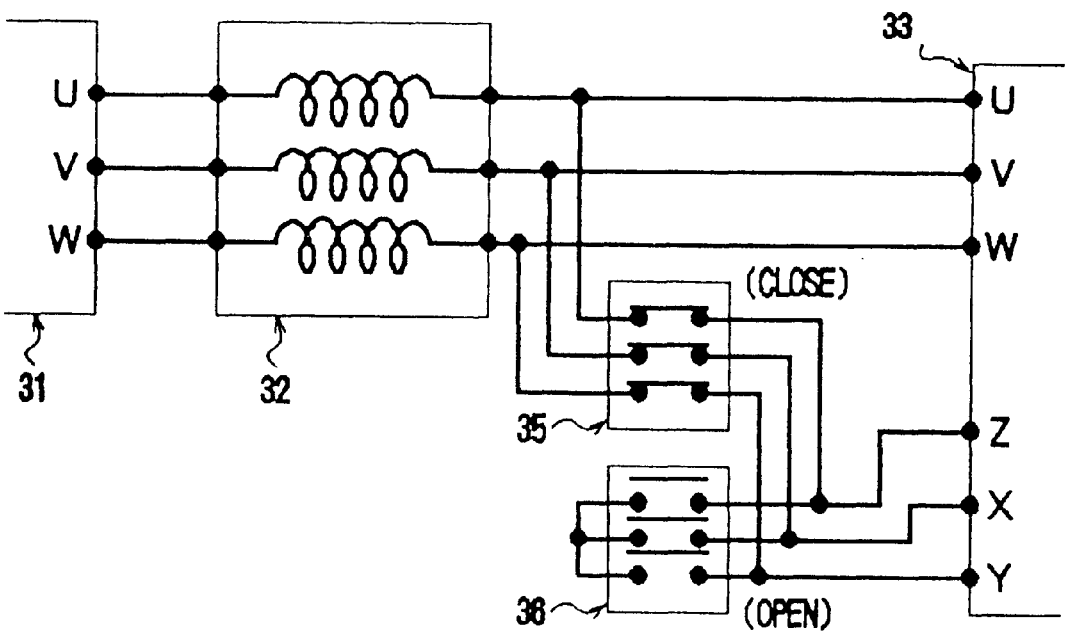
FIG. 10B is a wiring diagram showing the state, in which the first and second switches shown in FIG. 10A are switched over so that primary winding in a motor is in Δ-connection.

The third and fourth embodiments are applied to the primary winding of the motor, in which the first and second U-phase windings 10, 11 connected in series, first and second V-phase windings 12, 13 connected in series, and first and second W-phase windings 14, 15 connected in series are set up in the form of Y-connection as shown in FIGS. 9A and 9B. Then, the first and second U-phase windings 10, 11 are respectively provided with terminals U1, U2, the first and second V-phase windings 12, 13 are respectively provided with terminals V1, V2, and the first and second W-phase windings are respectively provided with terminals W1 and W2.

Third Embodiment

A description will now be given of the third embodiment with reference to FIGS. 3A and 3B.

Figure 3A:
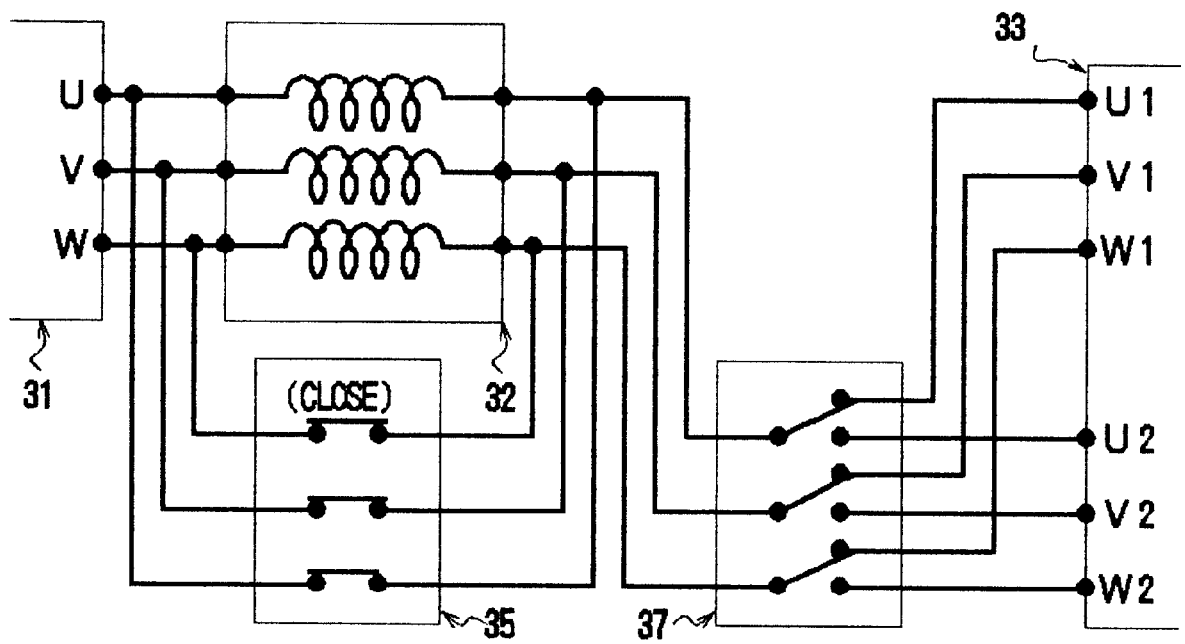
FIG. 3A is a wiring diagram of connection between a power source side and a motor side as a third embodiment according to the present invention, in which a switch and a changeover switch are set for low-speed operation.

Referring to FIG. 3A, the U-phase, V-phase and W-phase on the power source side 31 are connected to a changeover switch 37 through a parallel connector composed of the reactor 32 and the switch 35. Further, this changeover switch 37 is selectively switched over to the state, in which connection to the terminals U1, V1 and W1 on the motor side 33 is made and the state, in which connection to the terminals U2, V2 and W2 is made.

In FIG. 3A, the switch 35 is set to OFF, and the changeover switch 37 is switched over to the side of the terminals U1, V1 and W1 on the motor side 33. As a result, the U-phase, V-phase and W-phase on the power source side 31 are connected to the terminals U1, V1 and W1 on the motor side 33 through the reactor 32 and simultaneously through the switch 35. Thus, since the terminals U1, V1 and W1 on the motor side 33 are connected to the terminals U1, V1 and W1 on the motor side 33, the number of turns of the winding in each phase of the motor comes to the sum of the turns of the first and second windings (windings 10 and 11, 12 and 13, and 14 and 15 in FIG. 9A), so that the state suitable for attaining the characteristics for low-speed operation is achieved. Furthermore, even if the power source side 1 is connected through the parallel connectors composed of the switch 35 and the reactor 32, the current on the power source side 31 is supplied to the motor side 33 mostly through the first switch 35, since the reactor 32 exerts high impedance. As the result, the reactor 32 in FIG. 3A is placed in the substantially disconnected state. Thus, the power source side 31 and the motor side 33 in FIG. 3A are connected to each other as shown in FIG. 9A.

Figure 3B:
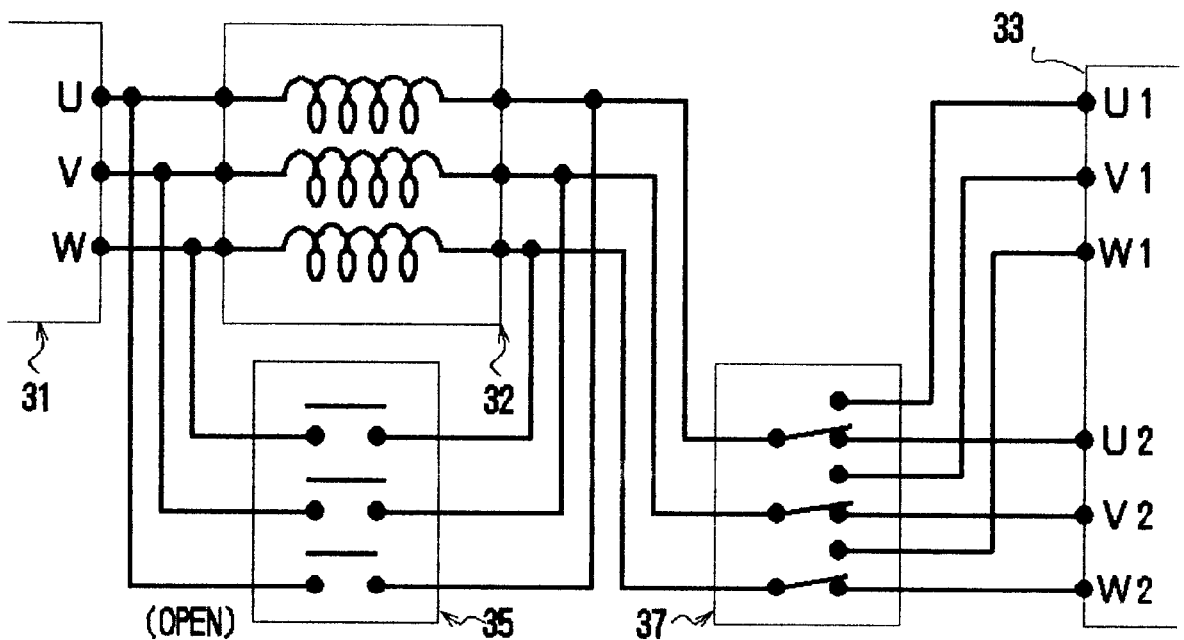
FIG. 3B is a wiring diagram of connection as the third embodiment according to the present invention, wherein the switch and the changeover switch shown in FIG. 3A are switched over for high-speed operation.
Figure 7:
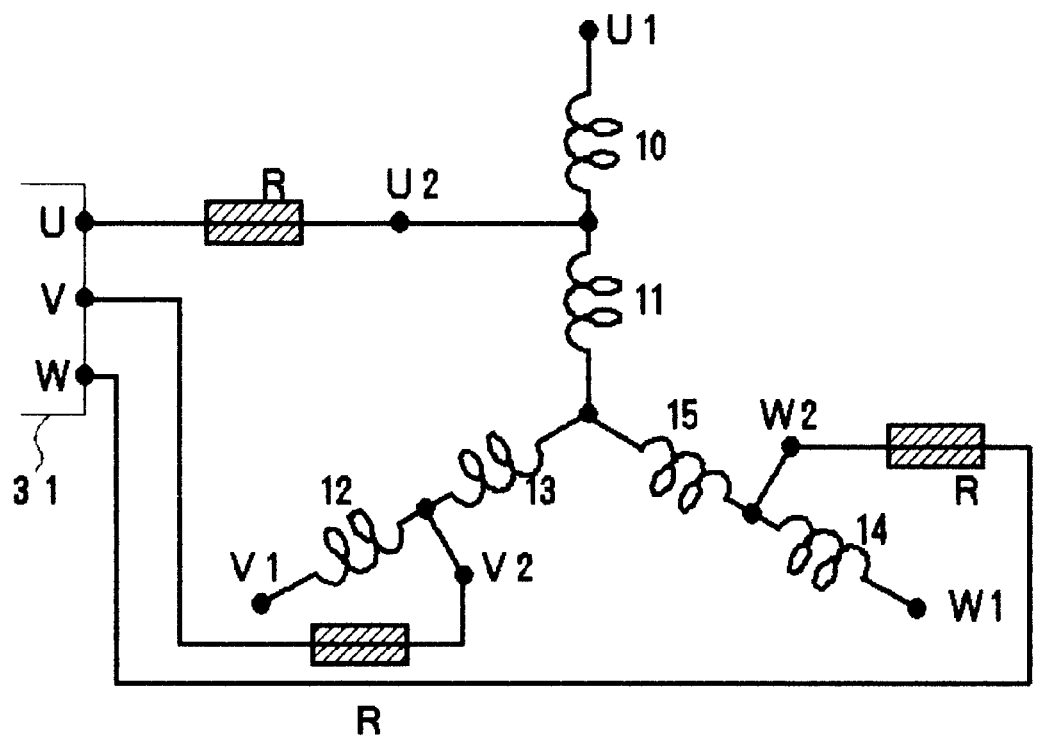
FIG. 7 is a wiring of connection between the power source side and the motor side shown in FIGS. 3B and 4B.

In the case of FIG. 3B, the switch 35 in FIG. 3A is switched over to OFF, and the changeover switch 37 in FIG. 3A is switched over to the side of the terminals U2, V2 and W2 on the motor side 33. As a result, the U-phase, V-phase and W-phase on the power source side 31 are respectively connected to the terminals U2, V2 and W2 on the motor side 33 through the reactor 32. Since the U-phase, V-phase and W-phase on the power source side 31 are respectively connected to the terminals U2, V2 and W2 on the motor side 33, the number of turns of the winding in each phase of the motor becomes equal to the number of turns of corresponding one of the second windings (the winding 11, 13, 15 in FIG. 9A), thus providing the number of turns suitable for attaining the characteristics for high-speed operation, and further, the reactor 32 is interposed between the windings 11, 13, 15 and the power source side 31. Thus, the power source side 31 and the motor side 33 in FIG. 3B are connected to each other as shown in FIG. 7.

As described above, the switch 35 in FIGS. 3A and 3B has a function of interposing the reactor 32 between the power source side 31 and the motor side 33 and disconnecting the reactor from the power source side and the motor side by selecting between ON state and OFF state of the switch 35. Further, the changeover switch 37 has a function of increasing and decreasing the number of turns of the windings in the primary winding of the motor.

Fourth Embodiment

A description will now be given of a fourth embodiment with reference to FIGS. 4A and 4B.

Figure 4A:
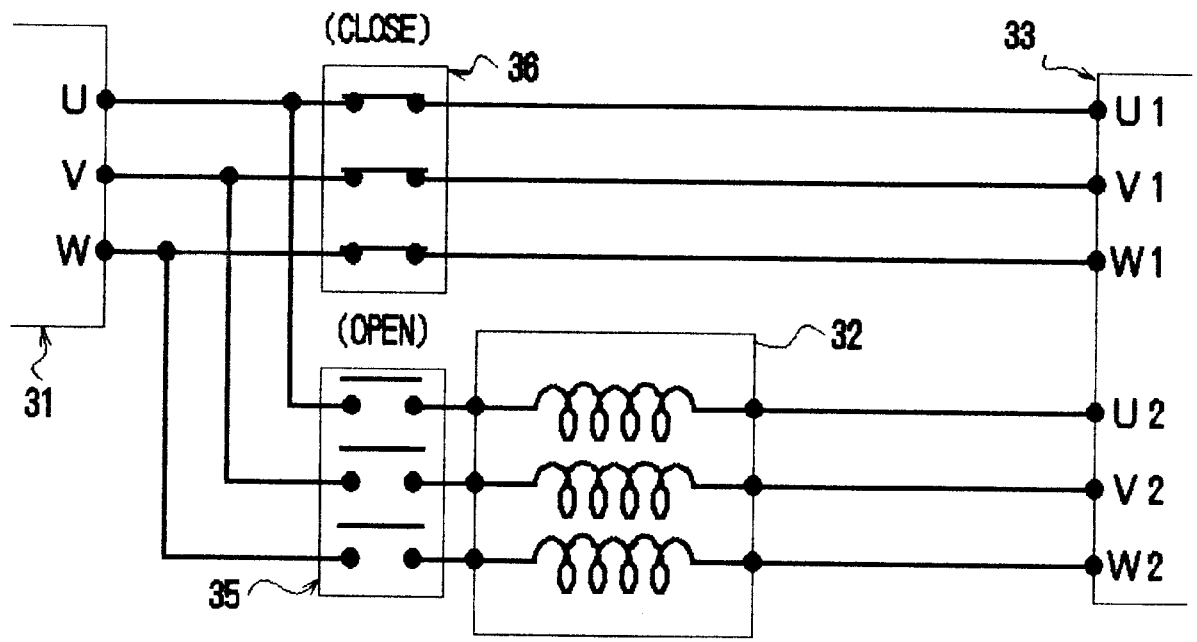
FIG. 4A is a wiring diagram of connection between a power source side and a motor side as a fourth embodiment according to the present invention, in which first and second switches are set for low-speed operation.

Referring to FIG. 4A, the U-phase, V-phase and W-phase on the power source side 31 are respectively connected to the terminals U2, V2 and W2 on the motor side 33 through serial connectors composed of the first switch 35 and the reactor 32. Further, the U-phase, V-phase and W-phase on the power source side 31 are respectively connected to the terminals U1, V1 and W1 on the motor side 33 through the second switch 36.

In FIG. 4A, the first switch 35 is set to OFF, and the second switch 36 is set to ON. Thus, the U-phase, V-phase and W-phase on the power source side 31 are connected to the terminals U1, V1 and W1 on the motor side 33 without interposing the reactor 32. That is, the power source side 31 and the motor side 33 are connected to each other as shown in FIG. 9A, and the number of turns in the primary winding of the motor is increased to provide the connection suitable for attaining the characteristics for low-speed operation.

Figure 4B:
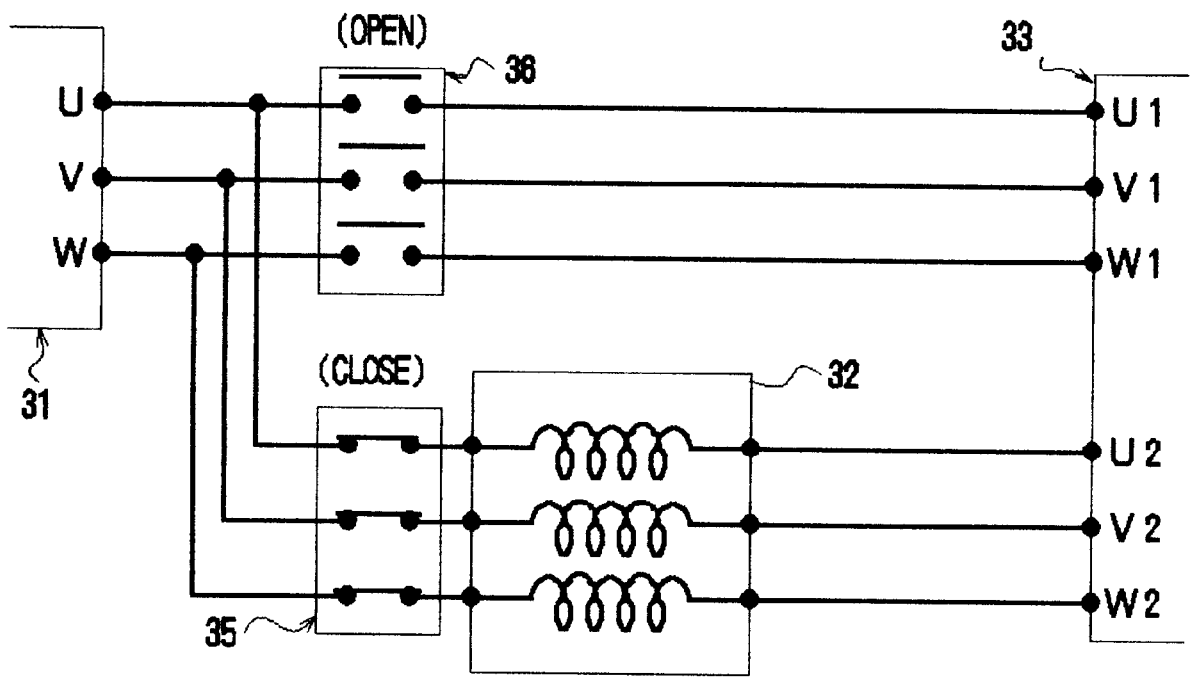
FIG. 4B is a wiring diagram of connection as the fourth embodiment according to the present invention, wherein the first and second switches shown in FIG. 4A are switched over to the state for high-speed operation.
Figure 8:
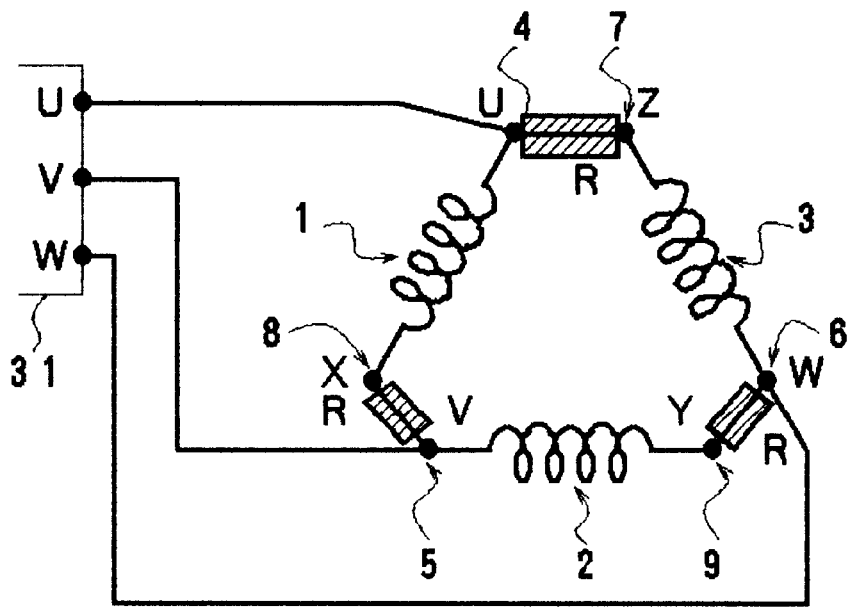
FIG. 8A is view showing the state, in which primary winding in a three-phase motor is set up in the form of Y-connection.
FIG. 8B is a view showing the state, in which primary winding in a three-phase motor is set up in the form of Δ-connection.

In the case of FIG. 4B, the first switch 35 in FIG. 4A is switched over to ON, and the second switch 36 is switched over to OFF. As a result, the U-phase, V-phase and W-phase of the power source side 31 are connected to the terminals U2, V2 and W2 on the motor side 33 through the reactor 32. As a result, the power source side 31 and the motor side 33 are connected to each other as shown in FIG. 7, and the number of turns in the primary winding of the motor is decreased to provide the connection suitable for attaining the characteristics for low-speed operation.

What is claimed is:

1. An AC motor with a reactor interposed between a power source and the motor, comprising:

a connection switching means for switching primary winding connection in a three-phase AC motor between Y-connection and Δ-connection, a reactor interposed between the power source and the motor; and a reactor interposition changeover means connected to said reactor for selectively switching between the state, in which voltage is supplied from the power source to the motor side through said reactor, and the state, in which the voltage is supplied from the power source to the motor side without passing through said reactor, wherein said reactor employed in connection with the switching of the winding between the Y-connection and the Δ-connection suppresses increases of harmonies due to inductance changes caused by switching between the Y-connection and the Δ-connection.

2. An AC motor with a reactor interposed between a power source and the motor, comprising:

a connection changeover switch for switching primary winding connection in a three-phase AC motor between Y-connection and Δ-connection; and a reactor and a switch respectively interposed in parallel between a power source of said motor and said changeover switch;

wherein said reactor is interposed between the power source and the motor in a manner such that the reactor can be connected thereto and disconcerted therefrom by on-off operation of said changeover switch, wherein said reactor employed in connection with the switching of the winding between the Y-connection and the Δ-connection suppresses increases of harmonies due to inductance changes caused by switching between the Y-connection and the Δ-connection.

3. An AC motor with a reactor interposed between a power source and the motor, comprising:

a connection changeover switch for switching primary winding connection in a three-phase AC motor between Y-connection and Δ-connection; and serial connectors composed of a switch and a reactor and interposed between first, second and third terminals of the three-phase AC motor and fourth, fifth and sixth terminals of the three-phase AC motor;

wherein the power source is connected to the motor through said reactor or directly without interposing said reactor by on-off operation of said changeover switch, and said reactor employed in connection with the switching of the winding between the Y-connection and the Δ-connection suppresses increases of harmonies due to inductance changes caused by switching between the Y-connection and the Δ-connection.

4. An AC motor with a reactor interposed between a power source and the motor, comprising:

a primary winding provided for the motor and having a voltage application terminal group for increasing the number of turns in said primary winding and another voltage application terminal group for decreasing the number of turns in said primary winding;

a reactor interposed between a power source and the motor; and a reactor interposition changeover means connected to said reactor for selectively switching between the state, in which voltage is supplied from the power source to the motor side through said reactor, and the state, in which the voltage is supplied from the power source to the motor side without passing through said reactor;

wherein said reactor employed in connection with switching between the voltage application and the another voltage application suppresses increases of harmonies due to inductance changes caused by switching between voltage applications.

5. An AC motor with a reactor interposed between a power source and the motor, comprising:

a changeover switch for selecting either a connection to a voltage application terminal group to increase the number of turns in a primary winding of a three-phase AC motor or a connection to a voltage application terminal group to decrease the number of turns in said primary winding; and a switch and a reactor interposed in parallel between said changeover switch and a power source;

wherein the power source is connected to the voltage application terminal group to increase the number of turns in the primary winding without interposing the reactor or the power source is connected to the voltage application terminal group to decrease the number of turns in the primary winding through the reactor by on-off operation of said changeover switch, and said reactor employed in conjunction with switching between connections suppresses increases of harmonies due to inductance changes caused by switching connections.

6. An AC motor with a reactor interposed between a power source and the motor, comprising:

a first switch interposed between the power source and a voltage application terminal group to decrease the number of turns in a primary winding of a three-phase AC motor; and serial connectors composed of a second switch and said reactor and interposed between the power source and a voltage application terminal group to increase the number of turns in said primary winding;

wherein when said first switch is set to ON and said second switch set to OFF, the power source is connected directly to the voltage application terminal group to increase the number of turns in the primary winding, while when said firs switch is switched over to OFF and sad second switch is switched over to ON, the power source is directly connected to the voltage application terminal group to decrease the number of turns in the primary winding through the reactor, and said reactor employed in connection with switching between said first and second switches suppresses increases in harmonics due to inductance changes caused by changing switches.

* * * * *